United States Patent

[11] 3,576,302

[72] Inventor Raymond D. Palfreyman
        Clifton, N.J.
[21] Appl. No. 743,660
[22] Filed July 10, 1968
[45] Patented Apr. 27, 1971
[73] Assignee The Bendix Corporation
        Teterboro, N.J.

[54] SOLID-STATE POSITION SENSOR FOR SENSING AN ADJUSTED POSITION OF A CONTROL ELEMENT
2 Claims, 4 Drawing Figs.

[52] U.S. Cl. .................................................. 244/83,
        244/77, 340/177
[51] Int. Cl. ..................................................... B64c 13/04,
        B64c 13/18
[50] Field of Search .......................................... 340/177;
        244/77, 770 (V), 77 (M), 77 (SE), 83, 83.91, 86

[56] References Cited
UNITED STATES PATENTS
2,880,409  3/1959  Gallentine ....................  340/177
2,909,764  10/1959  Chambers ....................  340/177

Primary Examiner—Milton Buchler
Assistant Examiner—Jeffrey L. Forman
Attorney—Plante, Hartz, Smith and Thompson ABSTRACT: A solid-state position sensor for sensing an adjusted position of a control element for applying information corresponding to the sensed position of the control element to a system for controlling a surface of an aircraft and more particularly the disclosure relates to a solid-state rudder pedal position sensor including strain gages to provide signals corresponding to flexure of an associated spring member by the adjusted position of a rudder pedal to differentially unbalance an electrical bridge and provide an electrical output signal corresponding to the adjusted position of the rudder pedal and which output signal may effectively modify an automatic pilot control system for a control surface or rudder of an aircraft.

INVENTOR.
RAYMOND D. PALFREYMAN
BY Herbert L. Davis
ATTORNEY

INVENTOR.
RAYMOND D. PALFREYMAN
BY
ATTORNEY

SOLID-STATE POSITION SENSOR FOR SENSING AN ADJUSTED POSITION OF A CONTROL ELEMENT

CROSS-REFERENCE TO RELATED APPLICATIONS

The present invention relates to an improved means for applying a solid-state force sensor so as to sense an adjusted position of a control element, as distinguished from sensing merely the force applied to control instruments of a type such as disclosed and claimed in a copending U.S. application Ser. No. 616,067, filed Feb. 14, 1967 by Raymond D. Palfreyman, now U.S. Pat. No. 3,447,766, granted June 3, 1969, and in a copending U.S. application Ser. No. 710,164, filed Mar. 4, 1968 by John C. Vaiden, now U.S. Pat. No. 3,473,760, granted Oct. 21, 1969, both of which patents have been assigned to The Bendix Corporation, assignee of the present invention.

BACKGROUND OF THE INVENTION

1. Field of the Invention

This invention relates to the aircraft control field and more particularly to a solid-state rudder pedal position sensor and to a means for sensing the rudder pedal position and applying information corresponding to the sensed position so as to modify an automatic pilot control system for the aircraft.

2. Description of the Prior Art

Heretofore, control sticks and control wheels for manually controlling flight of an aircraft have used synchros or relatively movable core transformers for detecting forces applied to the control stick or control wheel as disclosed and claimed in U.S. Reissue Pat. No. 25,356 granted Mar. 19, 1963 to Robert E. Feucht, John Jarvis and John C. Ziegler; U.S. Pat. No. 3,057,585 granted Oct. 9, 1962 to John C. Ziegler, Lucien R. Beauregard and Harry Langer; and U.S. Pat. No. 3,119,580 granted Jan. 28, 1964 to Norman B. Murphy and all of which patents have been assigned to The Bendix Corporation.

In such prior controls, it was found that relative movement of the rotor and stator of the synchro or movement of the core relative to the windings of the transformer was accompanied by internal friction and hysteresis which introduced erroneous measurement. Further, redundance in such systems is not practical if minimum weight and size is desired.

In an effort to overcome the difficulties encountered in such prior control devices, the present inventor has heretofore devised an arrangement in which solid-state strain gauges are attached to a control stick to detect pilot-applied forces on the control stick about two orthogonal axes as disclosed and claimed in the aforenoted U.S. Pat. No. 3,447,766, granted June 3, 1969 to Raymond D. Palfreyman and assigned to The Bendix Corporation.

Moreover, in such control stick arrangements, there have been provided a control element having a pair of spring sections orthogonal to one another to detect forces applied to the control stick about two mutually perpendicular axes. At least one strain gauge is preferably mounted on each side of a spring section to simultaneously detect the compression and tension of the spring section. The strain gauges associated with each spring section are connected in a Wheatstone bridge to differentially unbalance the bridge when the spring section flexes so as to provide an output corresponding to the force applied to the spring section of the control stick, as distinguished from the adjusted position of the control stick.

Further in prior type control wheel hub force sensor designs, such as disclosed in the aforenoted U.S. Pat. No. 3,119,580 granted Jan. 28, 1964 to Norman B. Murphy, there have been provided cylindrical race ball bearings to cancel the undesired twisting couples, which have been found to be at the heart of the problem encountered in such control wheel hub force sensor, but through the arrangement of strain gauge transducers in a control wheel hub of a type such as disclosed and claimed in the aforenoted U.S. Pat. No. 3,473,760, granted Oct. 21, 1969 to John C. Vaiden, the provisions of such ball bearings have been eliminated as unnecessary.

Such arrangements in the control stick and in the control wheel hub force sensor of strain gauge transducers relate to distinctly different problems from those to which the present invention is directed, in that the present invention is directed to solve the ever increasing need for redundancy in the sensing of the position of a control element, as distinguished from the force applied thereto. In the prior type position sensors, there has been encountered a problem with regard to weight and operational requirements when the commonly used prior art type electromagnetic position-sensing devices are applied.

In the present invention, the sensing of the position of the control element by the piezoresistive diodes is effected by operatively connecting the control element to the piezoresistive diodes through a cam having an effective cam surface cooperatively arranged in relation to a calibrated stressed member or leaf spring so as to provide a linear deflection of the leaf spring on which the piezoresistive diodes are affixed at opposite side surfaces thereof so as to cause a stress to be imparted to the piezoresistive diodes effecting through bridge circuits controlled thereby electrical output signal of a sense and magnitude correlated to the position of the control element.

Moreover, redundant sensing may be readily provided through the solid-state means of sensing an adjusted position of a control element as set forth in the present invention in which the weight and operational envelope parameters may be minimized by a proper application of the semiconductor strain gauge, while in addition through the simplified construction of the solid-state control element position sensor a minimum utilization of moving parts effectively enhances its reliability.

SUMMARY OF THE INVENTION

In instrumenting a solid-state control element or rudder pedal position sensor to generate electrical signals corresponding to the adjusted positions of pilot-operated rudder pedals, there is provided a leaf spring instrumented with semiconductor strain gauges applied at opposite side surfaces thereof and interconnected into an electrical bridge so that axial strains cancel out, while bending strains augment so as to render such strain gauges of the pedal position sensor responsive only to the controlling position of the pedals, as distinguished from the force applied to the pedals.

The arrangement is such that apparent strains from temperature changes are self-canceling with respect to the strain gauges applied to the leaf springs, while the rudder pedal is operatively connected through suitable loss motion means to mechanically position the rudder or control surface of the aircraft, while within the loss motion range the rudder pedal is effectively connected through a cam carried by a pivotally mounted operating shaft so as to vary with the adjusted position of the pilot-operated pedal the stress applied to the leaf spring carrying the semiconductor strain gauges to provide through an electrical bridge an electrical output signal to modify an automatic control system for positioning the rudder or control surface of the aircraft.

An object of the present invention, therefore, is to provide a solid-state rudder pedal position sensor having minute piezoresistive strain gauges so arranged as to sense the adjusted position of one or both of a pair of dual-pedal controls for operatively positioning a rudder or control surface of the aircraft.

A further object of the invention is to provide a rudder pedal position sensor including minute strain gauges applicable to sense the position of one or the other or both of a pair of pedals adjustably positioned by either or both feet of a pilot without introducing signal errors related to the point of force application or the magnitude of the force applied on the control pedals.

Another object of the invention is to sense the position of a pair of control elements for an aircraft in an operative arrangement including minute strain gauges with a minimum of moving parts.

A further object of the invention is to sense the pilot-adjusted position of the control pedals of an aircraft by piezoresistive diodes without erroneous measurements caused by hysteresis and internal friction, or the magnitude of the applied forces or the point of application of the forces to the control pedals.

Another object of the invention is to provide a pair of rudder pedal position sensors including a rectangular leaf spring member operatively connected to the pair of rudder control pedals through an angularly adjustable cam means bearing upon the leaf spring member and including on the spring member suitable semiconductor strain gauges so mounted thereon that a force applied to one or the other of the pedals may cause an angular adjustment of the cam means to effect an appreciable flexure of the leaf spring member and a resultant change in the controlling resistance of the semiconductor strain gauges mounted on the spring member to effect a controlling action in a control system for operatively positioning a rudder or control surface of the aircraft.

Another object of the invention is to provide minute semiconductor strain gauges in a compact rudder pedal position sensor, so arranged that redundancy in measuring the adjusted position of the control pedals of an aircraft control system may be readily effected as distinguished from the operating force applied to the control pedals.

Another object of the invention is to provide a solid-state rudder pedal force sensor, including a rectangular leaf spring which deflects torsionally in response to an adjustably positioned cam means operatively controlled by one or the other or both of a pair of controlling pedals, the rectangular leaf spring including semiconductor strain gauges having piezoresistive characteristics such that small changes in strain effected by the torsional deflection of the leaf spring causes large changes in the resistance of the gauges mounted on the leaf spring, while such semiconductor strain gauges are electrically connected in suitable control circuitry so as to provide electrical signals of a sense and magnitude corresponding to the respective sense and magnitude of the adjusted position of the rudder control pedals.

These and other objects and advantages of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

DESCRIPTION OF THE DRAWINGS

In the drawings in which corresponding numerals indicate corresponding parts.

DESCRIPTION OF A PREFERRED EMBODIMENT

Figure 1:
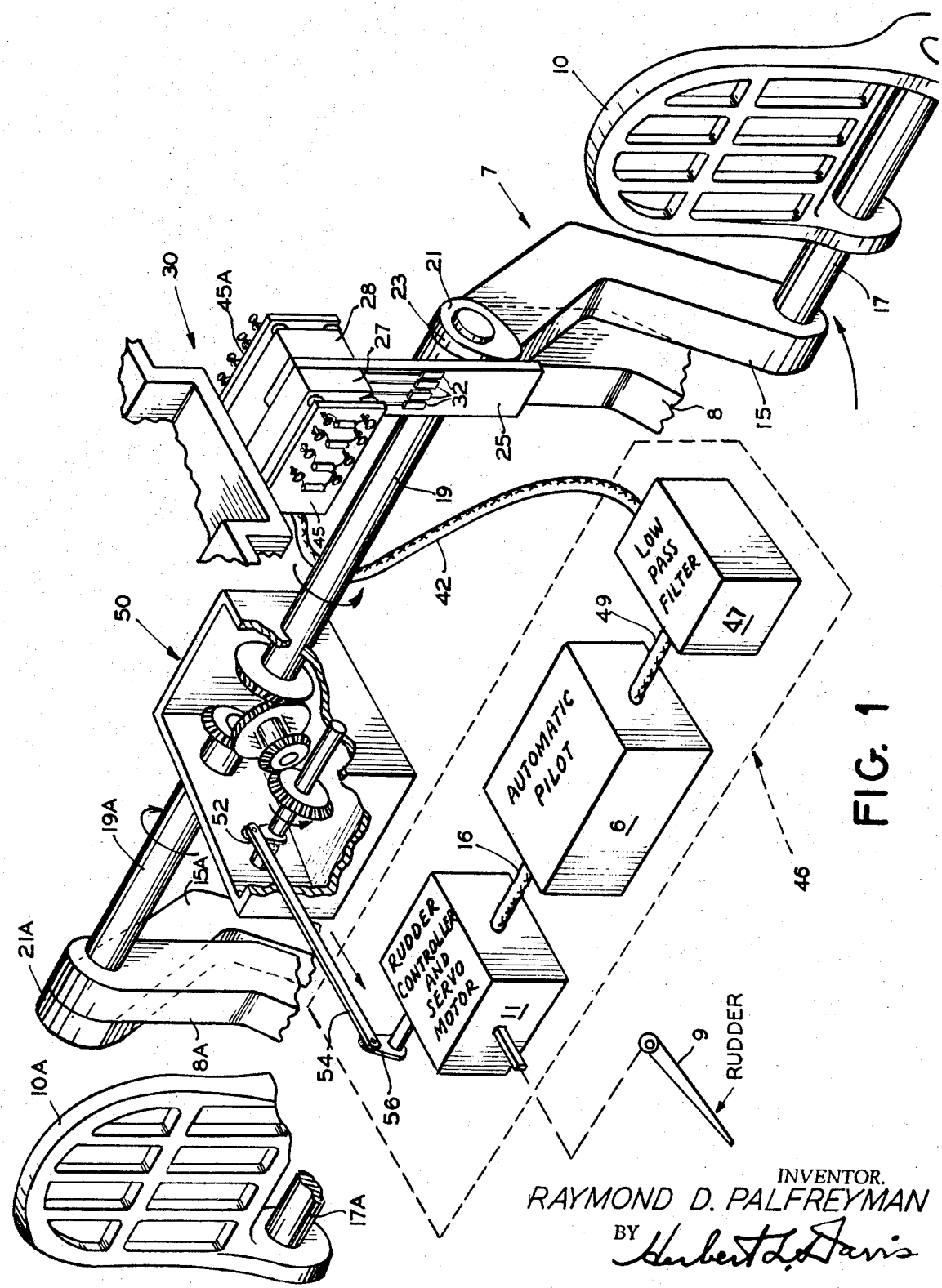
FIG. 1 illustrates schematically a pair of pedals for controlling the rudder or control surface of an aircraft in an assembly embodying the present invention and shown in an operative relation in a control system in which the invention may be adapted for use.

Referring to the drawing of FIG. 1, there is shown schematically a control system of a type such as disclosed in the aforenoted U.S. Reissue Pat. No. 25,356, granted Mar. 19, 1963, and in which system there may be used the improved control pedal position sensor 7, shown in detail in FIG. 2. In the aforenoted system of FIG. 1, a control surface or rudder 9 of an aircraft may be operatively positioned automatically by an automatic pilot system denoted generally at 6 and which may be pilot controlled by the improved control pedal position sensor 7, including a pair of control pedals 10 and 10A pivotally supported by brackets 8 and 8A, respectively.

Figure 4:
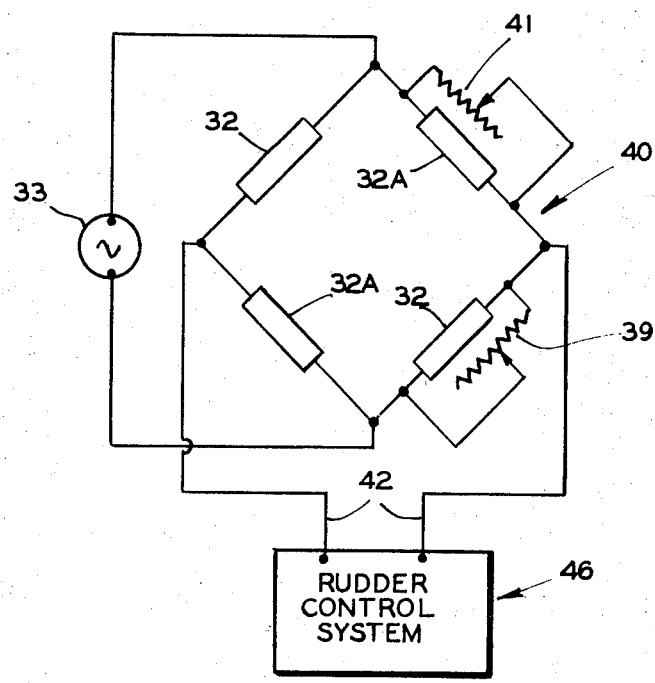
FIG. 4 is a wiring diagram of a typical full-bridge circuit for providing electrical signals corresponding to the adjusted position of the rudder pedals of FIGS. 1 and 2.

The control pedals 10 and 10A are pivotally mounted for angular movement relative to the supporting brackets 8 and 8A in opposite senses so that the angular displacements thereof effectively positions a control surface or rudder 9 of the aircraft through operation of a suitable controller and servomotor 11 of a type such as indicated diagrammatically in FIG. 4 of the aforenoted U.S. Reissue Pat. No. 25,356.

Similarly, a suitable gyroscopic compass or other suitable direction-sensing device operating in the automatic pilot 6 may apply electrical signals through conduits 16 to the controller and servomotor 11 so as to effect operation of the control surface or rudder 9 to provide the desired controlling action.

Upon the operator adjustably positioning the control pedals 10 and 10A in excess of a predetermined angular range, the deflective movement of the control pedals 10 and 10A is effective to cooperate in the control system, as explained hereinafter, so as to override the operation of the controllers and servomotor 11 by the automatic pilot 6 and render the control pedals 10 and 10A effective to control the position of the control surface or rudder 9 by a direct mechanical drive through the motor 11 which may be of a type such as shown by FIG. 4 of the aforenoted U.S. Reissue Pat. No. 25,356, and the operation of which is explained therein.

While in the aforenoted U.S. Pat. No. 3,447,766 and U.S. Pat. No. 3,473,760 piezoresistive diodes have been utilized as solid-state force sensors, it should be noted that in the present invention such devices are used advantageously for sensing an adjusted position of a control member, such as the pedals 10 and 10A.

Thus there is provided a position sensor 7 in which the control member 10 and 10A drives or operates a remote stress member or leaf spring 25 on which piezoresistive diodes or solid-state stress sensor elements 32 are suitably affixed at one side surface, while similar piezoresistive diodes or solid-state stress sensor elements 32A are suitably affixed at the opposite side surface of the leaf spring 25. The stress member or leaf spring 25 operated by the cam 21 is so calibrated as to produce through the sensing elements 32 and 32A an electrical signal across the output conductors 42 related to the position of the control elements 10 and 10A. The additional operation force required to drive the remote calibrated stress member 25 through the cam 21 may be made negligible and, therefore, not objectionable as a tare on the position sensor 7. This idea of means is effectively utilized in the rudder pedal position sensor 7 of the present invention, as hereinafter explained.

Figure 2:
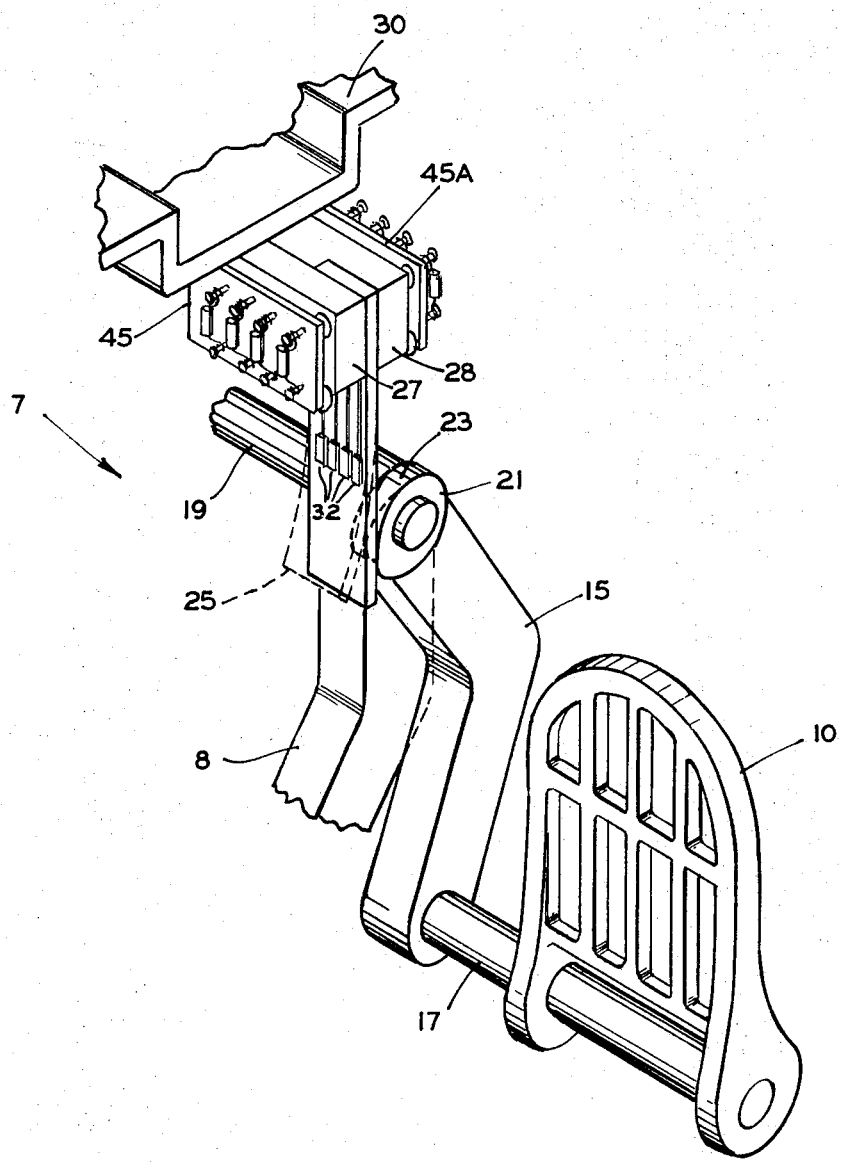
FIG. 2 is an exploded fragmentary perspective view of a rudder pedal position sensor embodying the present invention.

As illustrated in FIGS. 1 and 2, each of the rudder pedals 10 and 10A are rigidly mounted on separate arms 15 and 15A, respectively, which are connected thereto by a pin 17 and 17A projecting from a free end of the arm 15 and 15A. The arm 15 is in turn affixed at an opposite end to an outer end portion of a shaft 19 which is pivotally mounted in the supporting bracket 8 connected to the airframe structure. The arm 15A is similarly arranged in relation to a shaft 19A and supporting bracket 8A.

The shaft 19 has attached thereto at an outer end portion and adjacent the arm 15 a cam 21 having a cam surface 23 arranged in contacting relation with a free end of the stress member or rectangular leaf spring 25 having an opposite end portion clamped between supporting plates 27 and 28 carried by an airframe structure 30.

IMPROVED POSITION SENSOR

Thus in the present invention, there is provided the improved position translation means including electrical semiconductor strain gauges 32 and 32A mounted adjacent opposite side surfaces of the rectangular leaf spring 25. As shown by FIG. 2, the semiconductor strain gauges 32 are attached to one side surface of the stress member or position-sensing leaf spring 25 while similar strain gauges 32A are attached to the opposite side surface of the position-sensing rectangular leaf spring 25. The strain gauges 32 and 32A are secured, respectively, to the opposite side surfaces of the leaf spring 25 by suitable bonding means, such as an epoxy adhesive.

The strain gauges 32 and 32A may be of any suitable semiconductor types such as the piezoresistive-type strain gauges which effect a change of electrical resistance when a tensile or compressive stress is applied thereto. The strain gauges 32 on one side of the leaf spring 25 may be under compression while the strain gauges 32A on the opposite side of the leaf spring 25 are under tension when the leaf spring 25 flexes in one sense and the change in resistance of the strain gauges 32 and 32A effects an unbalance of a controlled bridge which is a measure of the flexure of the spring 25 in said one sense, while upon the leaf spring 25 being flexed in an opposite sense the strain gauges 32 may be under tension while the strain gauges 32A are under compression so as to effect an unbalance of the controlled bridge in an opposite sense.

The embodiment, as shown and described, uses similar strain gauges of either positive or negative gauge factor on opposite sides of the leaf spring 25 so that one strain gauge is in compression and the other strain gauge is in tension. However, it should be understood that strain gauges having positive and negative gauge factors may also be used. With this arrangement the positive and negative factor strain gauges will be mounted on the same side of the leaf spring 25 so that both strain gauges are under tension or compression, depending upon the direction of flex of the spring section. The resistance of one strain gauge 32 or 32A will increase and the resistance of the other strain gauge 32A or 32 will decrease to provide a differential output from a conventional bridge circuit in which the strain gauges are connected.

Figure 3:
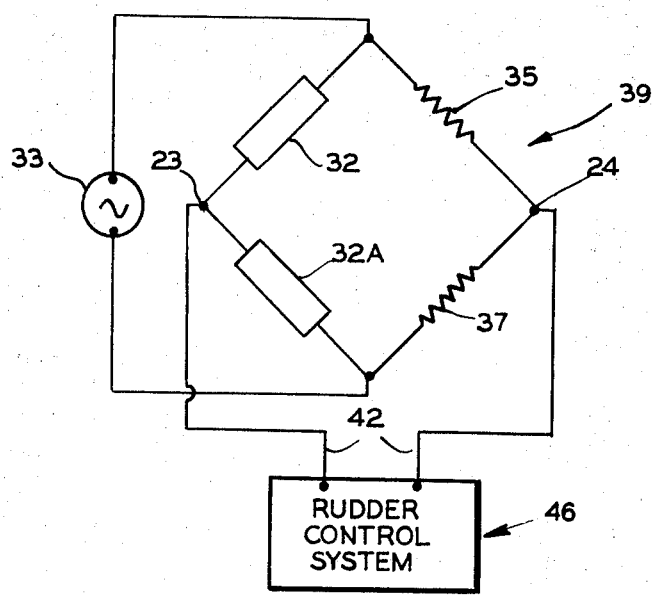
FIG. 3 is a wiring diagram showing a typical half-bridge circuit for providing electrical signals corresponding to the adjusted position of the rudder pedals of FIGS. 1 and 2.

As explained in the U.S. Pat. No. 3,447,766, granted June 3, 1969 to Raymond D. Palfreyman, a Wheatstone bridge having an electrical input source 33, which in the present instant is shown for purposes of illustration as of an alternating voltage, may be provided including piezoresistive strain gauges 32 and 32A mounted on opposite sides of the single rectangular leaf spring 25 and electrically connected in the bridge circuit in a balanced configuration with two calibrating resistors 35 and 37 so as to provide a typical half-bridge 39, as illustrated by FIG. 3. In an alternate arrangement, pairs of the strain gauges 32 and 32A may be connected in opposite pairs of the arms of a typical full-bridge 40, as shown by FIG. 4, having adjustable calibrating resistors 39 and 41 connected across a pair of the strain gauges 32 and 32A.

In the balanced configuration of either bridge 39 or 40, the rectangular leaf spring 25 is not flexed whereupon the output voltage applied across lines 42 from the controlled bridge circuit will be zero, while upon the control member 10 being adjusted from a neutral position the rectangular leaf spring 25 is flexed in a sense dependent upon the position of the control element 10.

Referring now to FIG. 2, it will be seen that the shaft 19 provides a pivot point in the rudder pedal linkage which linkage is in turn implemented by a cam 21 having a cam surface 23 bearing on the rectangular leaf spring 25. The pivot point of the shaft 19 is so chosen as to be in a close operative relation to the rudder pedal 10, while the cam surface 23 of the cam 21 is so designed as to provide a linear deflection of the remotely mounted leaf spring 25, when the shaft 19 is rotated through its angular deflection by operation of the pedal 10.

Moreover, the solid-state strain gauges 32 and 32A positioned at the opposite side surfaces of the rectangular leaf spring 25 are so calibrated as to produce a signal output across the bridge output lines 42 which is related to the angular position of the operating member or rudder control pedal 10. The solid-state strain gauges 32 and 32A may be arranged in multiple redundant operating circuits including controlled bridge circuits such as shown by FIGS. 3 and 4, so as to provide redundancy in the control of the automatic pilot 6.

In this manner, the strain gauges 32 and 32A sense the strain in the stress member or leaf spring 25 and provide an output signal across the output lines 42 of the bridge circuit controlled thereby which is related to the angular position of the control member or rudder pedals 10 and 10A.

Thus, upon the leaf spring 25 being flexed in response to an applied control force related to the sensed position of the respective pedals 10 and 10A, there will be applied at the outputs lines 42 of the controlled bridge circuit an alternating current signal of a phase dependent upon the sense of the adjusted positions fore or aft of the control pedals 10 and 10A and the resultant control force selectively applied to the leaf spring 25, and of a magnitude proportional to the stress applied to the leaf spring 25 which in turn is related to the adjusted position of the pedals 10 and 10A. The several calibrating resistor elements 35 and 37 or 39 and 41 of the respective bridge circuits of FIGS. 3 and 4 may be mounted on panel assemblies indicated in FIG. 2 generally by the numerals 45 and 45A to which there lead conductors from the controlling piezoresistive strain gauges 32 and 32A and from which there may lead appropriate output conductors 42, as well as the electrical energizing conductors from the source of alternating current 33.

The outputs 42 from the bridge circuits thus controlled by the semiconductor strain gauges 32 and 32A are electrically included in the control system of FIG. 1 so that upon an adjustment of the position of the control pedals 10 and 10A within a predetermined angular range of less than that required to overcome the operation of the rudder controller or servomotor 11, there will be developed an electrical control signal of a magnitude proportional to this angular adjustment and of a sense or electrical phase dependent upon the direction or sense of the adjusted angular position of the pedals 10 and 10A.

The developed signal is then applied through the appropriate output conductors 42 to a rudder control system 46, shown by FIGS. 1, 3 and 4 and which may include, as shown diagrammatically by FIG. 1 a low pass filter 47. From the low pass filter 47 the output signal may be applied through a conductor 49 leading from the filter 47 to the automatic pilot control system 6 to vary the setting of the automatic pilot system, as described in the aforenoted U.S. Reissue Pat. No. 25,356 and in the U.S. Pat. No. 3,119,580. As explained therein, the low pass filter 47 is provided so that the inertia of the pilot's foot and the arrangement of the control pedals 10 and 10A will not form an oscillating system in varying the setting of the automatic pilot system 6.

The improved rudder pedal position sensor 7 forming the subject matter of the present invention is shown in detail in FIG. 2 and includes an improved position-sensing mechanism 7 so arranged that the human pilot of the aircraft may, by adjustably positioning the pedals 10 and 10A, maneuver the aircraft while it is under automatic control. In the rudder pedal position sensor and control system shown schematically in FIG. 1 corresponding parts have been indicated by like numerals with the numerals indicating parts at the opposite side bearing the suffix A.

In the aforenoted arrangement of FIG. 1, the pedals 10 and 10A are suitably coupled through the pedal linkage arm 15 and 15A and shaft 19 and 19A, respectively, to a differential gearing 50 which may be of a conventional type so arranged that upon an angular adjustment of the arm 15 in a counterclockwise direction, as shown by FIG. 1, there is effected a clockwise angular adjustment of arm 15A, while the differential gearing 50 further causes an output arm 52 to position a control linkage 54 in an aft direction, as indicated by the arrows of FIG. 1. This in turn effects an angular adjustment of an arm 56 of the rudder controller and servomotor 11 in a counterclockwise direction to effect through suitable control mechanism provided in the controller 11 an angular adjustment of the position of the aircraft control surface or rudder 9 in a counterclockwise direction. The control mechanism of the controller 11 may be of a conventional type such as disclosed, for example, by the U.S. Reissue Pat. No. 25,356.

Similarly, the positioning of the pedal 10 in a clockwise direction and the pedal 10A in a counterclockwise direction, as viewed in FIG. 1, will effect an adjustment through the differential gearing 50 of the control linkage 54 in a forward direction to effect through the controller 11 an opposite clockwise adjustment of the angular position of the aircraft control surface or rudder 9.

The linkage arm 56 may be connected through suitable cooperating linkage to a differential linkage means in the controller 11 which may be of a type disclosed in the U.S. Reissue Pat. No. 25,356 so that initial adjustment of the position of the arm 56 within a predetermined limited range of angular positions will cause the electrical output signals from the controlled bridge circuits effected by the stressing of the leaf springs 25 and 25A and the resultant change in the resistance of the resistive elements 32 and 32A to modify the controlling action of the automatic pilot 6 in adjusting the position of the rudder 9, as heretofore explained.

Upon a positioning of the rudder control pedals 10 and 10A in excess of the predetermined initial limited range of angular adjustment, the pedals 10 and 10A are mechanically connected directly through the differential gearing 50 and the operating mechanism of the controller 11, as explained, for example, in the U.S. Reissue Pat. No. 25,356, so as to angularly position the rudder or control surface 9 of the aircraft in direct response to the adjusted positioning of the pedals 10 and 10A by the operator.

In operation then, the pilot may position the rudder pedal 10 in one sense and the rudder pedal 10A in an opposite sense with his feet to cause the arms 15 and 15A to travel through an angular distance around the pivot provided by the pivotal shafts 19 and 19A in opposite senses. The angular distance of travel of the arms 15 and 15A is related to the linear travel by a cam 21 carried by the shaft 19 in deflecting the stress member or leaf spring 25. The amount of the deflection of the spring 25, therefore, is related to the angular displacement of the rudder control pedals 10 and 10A around the pivot provided by the pivotal shafts 19 and 19A.

The strain gauges 32 and 32A in a single or multiple Wheatstone bridge circuitry of either half- or full-bridge construction, as shown by FIGS. 3 and 4, effect electrical signal outputs across the output conductors 42 which serve to modify the control of the rudder position within a predetermined limited angular range of adjusted positions of the pedals 10 and 10A, while upon the pedals 10 and 10A being adjustably positioned in excess of this limited angular range a direct mechanical driving connection between the pedals 10 and 10A and the rudder 9 is effected through the controller 11, as heretofore explained with reference to the U.S. Reissue Pat. No. 25,356.

There is thus provided an improved redundant rudder pedal position-sensing device providing minimum weight requirements and improved operational envelope parameters through the novel application of the semiconductor strain gauges 32 and 32A in the present invention to sense the angular position of the rudder position control pedals 10 and 10A. In addition, through the simplified construction of the present invention, there is effected a high reliability in operation due to the absence of moving parts in the arrangement of the position sensing semiconductor strain gauges 32 and 32A, as well as an arrangement providing negligible hysteresis and a high controlling signal output.

While the strain gauges 32 and 32A may be applied in single or multiple Wheatstone bridge circuitry of either half- or full-bridge construction, as shown by FIGS. 3 and 4, it will be also readily apparent that there may be impressed across the bridge either an alternating current, direct current or pulsating direct current power source for operating a control system which may be of a suitable type well known in the art and adapted to be controlled by the resultant electrical output signal applied across the lines 42.

Although only one embodiment of the invention has been illustrated and described, various changes in the form and relative arrangements of the parts, which will now appear obvious to those skilled in the art may be made without departing from the scope of the invention. Reference is, therefore, to be had to the appended claims for a definition of the limits of the invention.

I claim:

1. In an aircraft control system of a type including:
   motor means for adjustably positioning a control surface of the aircraft;
   a controller for the motor means;
   means responsive to a flight condition of the aircraft to operate the controller in accordance with an operative setting thereof;
   other means operable to override the operation of the controller by the flight condition responsive means so as to provide an independent operation of the controller of the motor means;
   an improvement comprising:
      operator-operative control means;
      mechanical means for operatively connecting the operator-operative control means to the controller of the motor means to effect said independent operation thereof;
      means for sensing an adjusted position of the operator-operative control means for modifying the operative setting of the aircraft flight condition responsive means; and
   the position sensing means including:
      a leaf spring affixed at one end portion to structure of said aircraft;
      cam means;
      the mechanical connecting means including means operatively connecting the operator-operative control means to said cam means;
      the cam means bearing upon an opposite free end portion of the leaf spring and operable to variably flex the leaf spring about said fixed one end portion in accordance with the adjusted position of the operator-operative control means;
      piezoresistive strain gauge means mounted on a side surface of the leaf spring;
      said piezoresistive strain gauge means changing electrical resistance upon tensile and compressive forces being applied thereto;
      an electrical bridge circuit means including the piezoresistive strain gauge means electrically connected therein and being arranged to electrically unbalance the bridge circuit means to provide electrical output signals of a polarity dependent upon the sense of the adjusted position of the operator-operative control means and of a magnitude corresponding to the adjusted position of the control means to modify the operative setting of the aircraft flight condition responsive means.

2. The improvement defined by claim 1 in which the operator-operative control means includes a pair of operator-operative pedals;
   the mechanical connecting means includes a pair of shafts and differential gearing means for operatively connecting the pair of pedals to said controller;
   at least one of said pair of shafts being operatively connected to said cam means so that the cam means may be adjustably positioned to variably flex the leaf spring in accordance with the adjusted position of the pair of pedals;
   the piezoresistive strain gauge means includes multiple pairs of piezoresistive strain gauges;
   one strain gauge of each pair of strain gauges being mounted on one side surface of the leaf spring;
   another strain gauge of each pair of strain gauges being mounted on an opposite side surface of the leaf spring;
   the mechanical connecting means being so arranged that a positioning of the operator-operative pedals within a predetermined limited range may cause the cam means to effect a stressing of the leaf spring and resultant change in the resistance of the strain gauges so as to provide at the bridge circuit means the electrical output signals to modify the operative setting of the aircraft flight condition responsive means and thereby effectively operate the controller in accordance therewith; and the operator-operative pedals being directly connected through said pair of shafts and differential gearing means of said mechanical connecting means to the other means to override the operation of the controller by the flight condition responsive means and operable upon a positioning of said pedals in excess of said predetermined limited range so as to provide the independent operation of the controller of the motor means and thereby adjustably position the control surface of the aircraft in direct response to the adjusted positioning of said operator-operative pedals in excess of said predetermined limited range.